United States Patent
Staniewicz

(10) Patent No.: US 7,558,669 B2
(45) Date of Patent: Jul. 7, 2009

(54) ENGINE CONTROLLER SYSTEM AND METHOD EMPLOYING HIGH SPEED ANGULAR POSITION SENSOR

(75) Inventor: Zbyslaw Staniewicz, Barrie (CA)

(73) Assignee: Litens Automotive Partnership, Woodbridge, Ontario (CA)

(*) Notice: Subject to any disclaimer, the term of this patent is extended or adjusted under 35 U.S.C. 154(b) by 263 days.

(21) Appl. No.: 11/577,234

(22) PCT Filed: Oct. 24, 2005

(86) PCT No.: PCT/CA2005/001632

§ 371 (c)(1),
(2), (4) Date: Apr. 13, 2007

(87) PCT Pub. No.: WO2006/045184

PCT Pub. Date: May 4, 2006

(65) Prior Publication Data

US 2008/0040021 A1 Feb. 14, 2008

(51) Int. Cl.
*G06F 19/00* (2006.01)
*F02P 5/00* (2006.01)

(52) U.S. Cl. .............. 701/115; 123/406.58; 73/114.26; 73/114.28

(58) Field of Classification Search .......... 701/102, 701/115; 123/406.58, 491; 73/114.01, 114.26, 73/114.28
See application file for complete search history.

(56) References Cited

U.S. PATENT DOCUMENTS

| | | | | | |
|---|---|---|---|---|---|
| 4,494,509 | A | * | 1/1985 | Long | 123/406.19 |
| 4,649,881 | A | * | 3/1987 | Long | 123/406.63 |
| 4,887,215 | A | * | 12/1989 | Kumagai et al. | 701/102 |
| 4,887,491 | A | * | 12/1989 | Holbrook et al. | 477/34 |
| 4,901,561 | A | * | 2/1990 | Glowczewski | 73/114.36 |
| 5,080,066 | A | | 1/1992 | Takeno et al. | |
| 5,148,106 | A | | 9/1992 | Ozawa | |
| 5,164,668 | A | | 11/1992 | Alfors | |
| 5,186,136 | A | | 2/1993 | Kadomukai et al. | |

(Continued)

OTHER PUBLICATIONS

Data Management in Real Time Systems: A Case of On Demand Updates in Vehicle Control Systems, T. Gustafsson & J. Hansson; Proceeding of the 10th, IEEE Real Time and Embedded.

(Continued)

*Primary Examiner*—John T Kwon
(74) *Attorney, Agent, or Firm*—Robin Asher; Clarkhill, PLC

(57) ABSTRACT

A control system and method for controlling a vehicle system, such as an engine, is taught. The controller uses the angular position of a rotating component, and in particular the angular phase of the rotating component to another rotating component, as an input. The input is determined with high resolution, yet is determined in a computationally efficient manner to reduce the amount of computation which must be performed by the controller. By producing a high resolution result in a computationally efficient manner, the result can be available to the controller almost immediately after the measurement is taken and the cost of controller can be less than it otherwise would be. In some embodiments, the system and method can also accurately determine the static angular position of one or more rotating members. The system and method are believed to be particularly suitable for determine the angular phasor between one or more camshafts and the crankshaft of an engine.

16 Claims, 5 Drawing Sheets

U.S. PATENT DOCUMENTS

| | | |
|---|---|---|
| 5,321,979 A | 6/1994 | Mc Kendry et al. |
| 5,537,967 A | 7/1996 | Tashiro et al. |
| 5,568,048 A | 10/1996 | Schroeder et al. |
| 5,670,875 A | 9/1997 | Alfors et al. |
| 5,673,998 A | 10/1997 | Kushihara |
| 5,710,703 A | 1/1998 | Kirn et al. |
| 5,860,406 A | 1/1999 | Schmidt et al. |
| 5,979,413 A | 11/1999 | Ohnuma et al. |
| 6,208,131 B1 | 3/2001 | Cebis et al. |
| 6,212,783 B1 | 4/2001 | Ott et al. |
| 6,288,533 B1 | 9/2001 | Haeberli et al. |
| 6,326,781 B1 | 12/2001 | Kunde et al. |
| 6,405,694 B2 | 6/2002 | Sato |
| 6,498,479 B1 | 12/2002 | Hamaoka et al. |
| 6,541,959 B2 | 4/2003 | Gudegeon et al. |
| 6,586,929 B1 | 7/2003 | Luetzow |
| 6,650,992 B2 | 11/2003 | Jankovic et al. |
| 6,693,423 B2 | 2/2004 | Weser |
| 6,732,713 B1 | 5/2004 | Kanazawa et al. |
| 6,806,702 B2 | 10/2004 | Lamb et al. |
| 7,391,180 B2 * | 6/2008 | Armiroli et al. ............. 318/801 |
| 2001/0050067 A1 | 12/2001 | Sato |
| 2003/0020468 A1 | 1/2003 | Kato et al. |
| 2003/0128026 A1 | 7/2003 | Lutz |
| 2004/0160220 A1 | 8/2004 | Wendt |
| 2004/0164729 A1 | 8/2004 | Ikeda et al. |
| 2004/0207392 A1 | 10/2004 | Kernhof |
| 2004/0217758 A1 | 11/2004 | Leonard |
| 2005/0030012 A1 | 2/2005 | Kunz-Vizenetz |

OTHER PUBLICATIONS

Technology and Applications Symposium (RTAS'04); May 25-28, 2004.

A Normalization Scheme to Reduce Numerical Errors in Inverse Tangent Computations on a Fixed Point Cordic Processor, K. Kota, J.R. Cavallero; 1992 IEEE Symposium on Circuits.

and Systems, vol. 3, May 3-6, 1992, pp. 1061-1064. abstract, section 3.

* cited by examiner

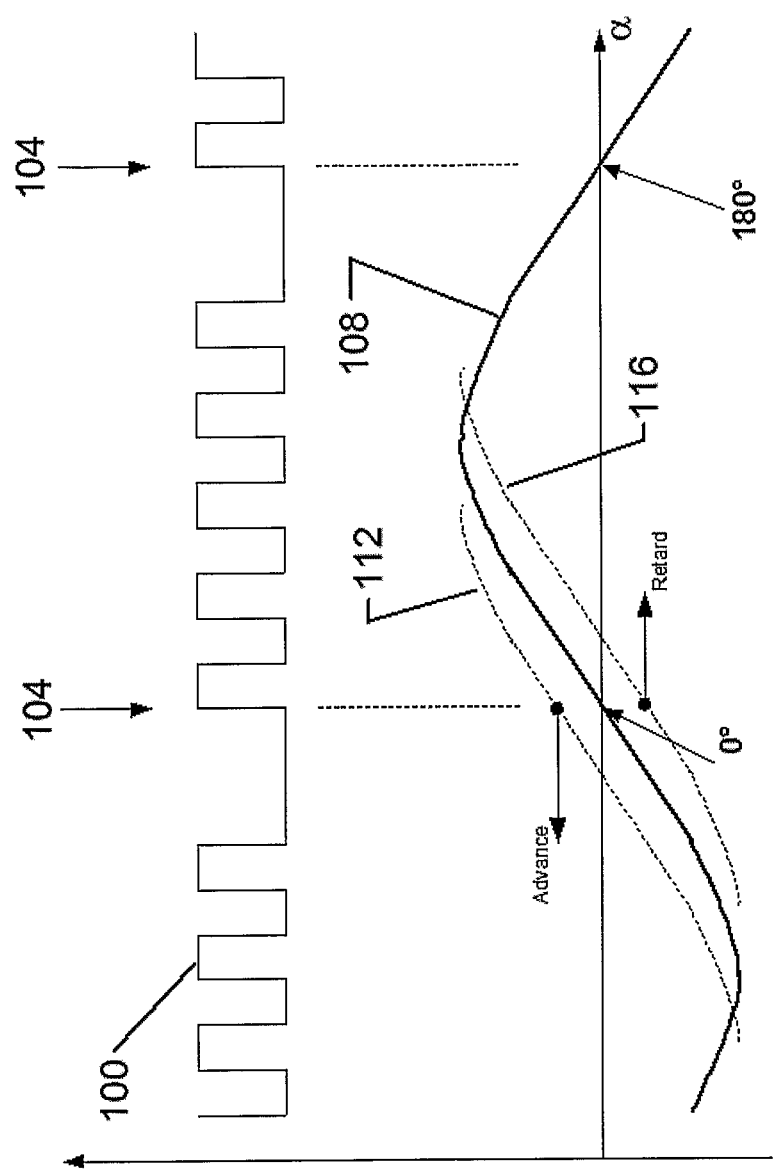

ENGINE CONTROLLER SYSTEM AND METHOD EMPLOYING HIGH SPEED ANGULAR POSITION SENSOR

FIELD OF THE INVENTION

The present invention relates to a system and method for controlling vehicle systems. More specifically, the present invention relates to a control system and method of controlling a vehicle system, such as the operation of an engine, or components of engine systems, where at least one input to the system and method is a signal representing the angular position of a rotating component of the vehicle.

BACKGROUND OF THE INVENTION

Controllers for vehicle systems, such as engine controllers, anti-lock brake systems, enhanced stability systems, etc. have been employed for several years. Such controllers generally comprise a microprocessor which executes a control program stored in a ROM memory.

In addition to the microprocessor and memories, such controllers include I/O ports through which they can receive signals from switches and sensors of the vehicle and through which they can output derived control signals to alter and control the operation of the vehicle system.

Typically, at least some of the sensors providing inputs to the controller are analog and thus the controller will include one or more A/D converters. Similarly, commonly one or more of the output control signals must be analog, so the controller will often also include at least one D/A converter.

Examples of sensor inputs to such controllers can include: engine temperature; crankshaft position; mass air flow rates; engine operating speed; oxygen content in the exhaust gas; wheel speed; steering wheel position; brake pedal travel and/or speed; brake system pressure; etc. Examples of operating outputs from such controllers can include: ignition timing advance or retard; fuel injection timing; fuel mixture; activation of a wheel brake, etc.

Recently, to improve engine efficiency and/or reduce emissions, variable valve timing systems have been employed with internal combustion engines. To operate such systems, the engine controller must be able to determine the relative angular positions (phase) of the crankshaft and camshaft(s) of the engine. To date, such determinations have typically been made from inductive pickups counting teeth on toothed gears mounted on the crankshaft and/or camshaft. While such systems do work, they are not very accurate and require complex operations to calibrate and generally do not provide high resolution results.

Further, such systems cannot provide an angular position signal to the engine controller when the engine is static, i.e. not rotating. Modern engine control strategies can benefit from a knowledge of the angular position of the crankshaft and camshaft(s) at start up to reduce emissions and reduce torsional forces on engine components.

While more accurate sensors can be employed with such systems, generally such sensors require additional sensor leads and/or controllers with more computational capacity and result in higher cost systems.

It is desired to have a system and method for controlling an engine or other vehicle system which can determine the position of one rotating component and/or the phase between two rotating components of the engine or other system with reasonably high resolution and at a reasonable cost.

SUMMARY OF THE INVENTION

It is an object of the present invention to provide a novel system and method for controlling a vehicle system which obviates or mitigates at least one disadvantage of the prior art.

According to a first aspect of the present invention, there is provided a system for controlling a vehicle system, comprising: a programmable controller having at least two inputs and at least one output; a first sensor operable to apply a voltage level to a first one of said at least two inputs, the voltage level varying sinusoidally with the angular position of a rotating component of the vehicle system; a second sensor operable to provide a signal to a second of said at least two inputs indicating the time at which the controller is to determine the angular position of the rotating component and wherein, in response to the signal from the second sensor, the controller determines the angular position of the rotating component represented by the voltage level at the first of said at least two inputs and, in accordance with a control program the controller is executing, the controller provides an appropriate output control signal to the vehicle system on said at least one output.

According to another aspect of the present invention, there is provided a method of controlling the operation of a vehicle system with a determined angular position of a first rotating component in the vehicle system as an input to the control process, comprising the steps of: at a time of interest, receiving from a sensor a voltage whose level varies sinusoidally with the angular position of the first rotating component; normalizing and scaling the received voltage such that the range of normalized and scaled received voltage levels correspond to the possible index values of an array of elements storing pre-computed angular position values; retrieving the pre-computed angular position value stored in the array element indicated by the index value corresponding to the normalized and scaled received voltage value; and using the retrieved pre-computed angular position value as an input to control the vehicle system.

The present invention provides a control system and method for a vehicle system, such as an engine, where the controller uses the angular position of a rotating component, and in particular the angular phase of the rotating component to another rotating component, as an input. The input is determined with high resolution yet is determined in a computationally efficient manner to reduce the amount of computation which must be performed by the controller. By producing a high resolution result in a computationally efficient manner, the result can be available to the controller almost immediately after the measurement is taken and the cost of controller can be less than it otherwise would be. In some embodiments, the system and method can also accurately determine the static angular position of one or more rotating members. The system and method are believed to be particularly suitable for determine the angular phasor between one or more camshafts and the crankshaft of an engine.

BRIEF DESCRIPTION OF THE DRAWINGS

Preferred embodiments of the present invention will now be described, by way of example only, with reference to the attached Figures, wherein:

FIG. 6 shows a graph illustrating the output of the relative outputs of the crankshaft position sensor of FIG. 4 and the sensor of FIG. 2.

DETAILED DESCRIPTION OF THE INVENTION

The assignee of the present invention has developed a novel sensor system and method for measuring the angular position and/or speed of a rotating member. Aspects of this system and method are described in detail in co-pending U.S. provisional patent applications: Rotational Position Sensor Based Engine Controller System, Ser. No. 60/621,767, filed Oct. 25, 2004, Vehicle Control System And Method, Ser. No. 60/631,756, filed Nov. 29, 2004, System and Method For Measuring Torsional Vibrations In An Engine and Managing Operation of the Engine To Reduce Those Vibrations, Ser. No. 60/697,879, filed Jul. 8, 2005, Method and System for Starting Or Re-Starting An Internal Combustion Engine Via Selective Combustion, Ser. No.60/711,872, filed Aug. 26, 2005 and co-pending U.S. patent application, Rotational Position Sensor Based Engine Controller System, Ser. No. 11/146,727, filed Jun. 7, 2005, the contents of each of which are incorporated herein by reference.

Figure 1:
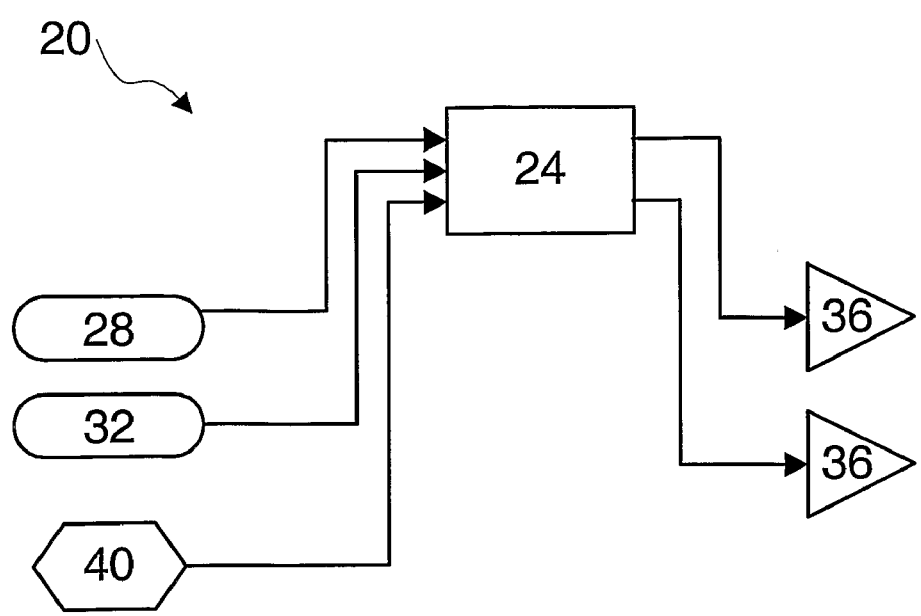
FIG. 1 is a schematic representation of a system for controlling the operation of a vehicle system in accordance with the present invention.

An engine control system in accordance with an embodiment of the present invention is indicated generally at 20 in FIG. 1. While the following discussion focuses on an engine controller and determining the phase angle between the crankshaft and at least one camshaft, the present invention is not so limited. As should be apparent to those of skill in the art, the present invention can also be employed with a wide variety of other vehicle systems, such as suspension, braking and various accessory systems and the controller can be, without limitation, a body control module (BCM), ABS control module or other vehicle controller.

In FIG. 1, control system 20 includes an engine control unit (ECU) 24 which can be a conventional ECU or the like as used in a variety of vehicles. ECU 24 includes a microprocessor or microcontroller and executes a control program which is stored in a ROM and/or FLASH RAM in ECU 24 and which is responsive to various defined inputs. ECU 24 processes the defined inputs in accordance with its control program and creates one or more corresponding outputs to control the engine or other vehicle systems accordingly.

Specifically, ECU 24 typically can accept one or more digital inputs 28 and one or more analog inputs 32. Digital inputs 28 can be sampled/buffered and acted upon by ECU 24, while analog inputs 32 are applied to an analog to digital (A/D) converter in ECU 24 to obtain a digital representation of the input upon which ECU 24 can than act upon.

As is also shown, ECU 24 produces one or more output control signals 36 which the ECU 24 employs to alter and control the operation of the engine or other vehicle systems it is controlling. Typically, output control signals 36 are analog signals produced by one or more digital to analog (D/A) converters in ECU 24, but output control signals 36 can also be digital signals.

In accordance with the present invention, ECU 24 is further supplied with a control signal from at least one angular position sensor 40. Sensor 40 is a magnetic rotation sensor, such as a model 2SA-10 Sentron sensor manufactured by Sentron AG, Baarerstrasse 73, 6300 Zug, Switzerland which is a differential Hall Effect sensor, or a KMZ41 magnetoresistive sensor from Philips Semiconductors or the like The following discussion assumes that the 2SA-10 sensor is employed but the changes required for other sensors, such as the KMZ41 will be apparent to those of skill in the art.

Figure 2:
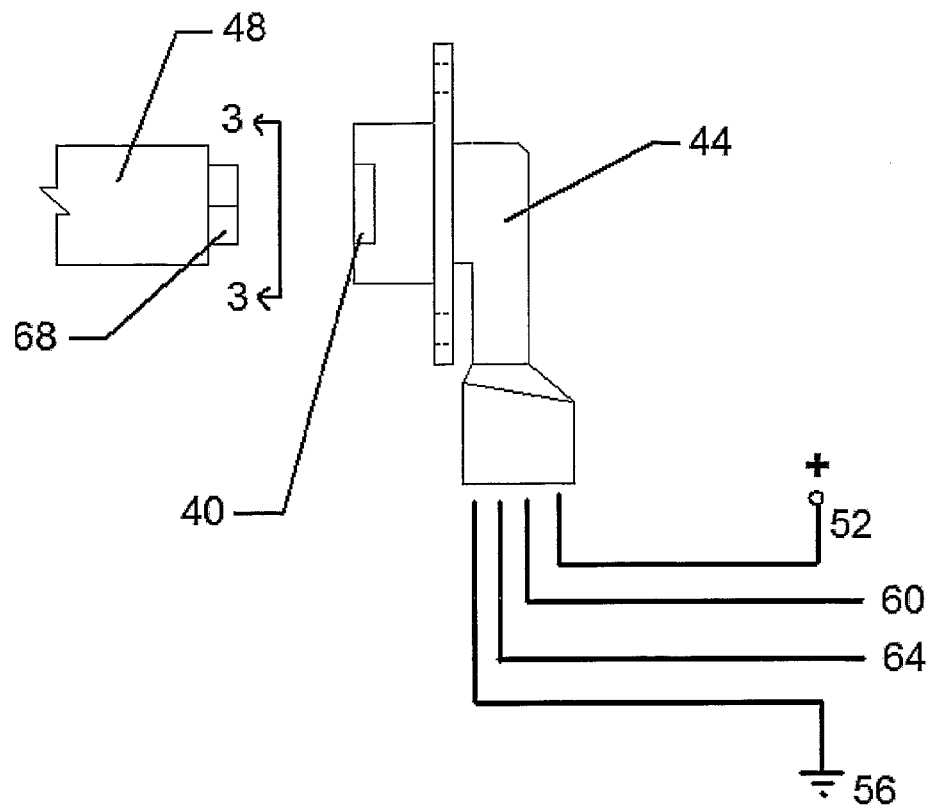
FIG. 2 is a schematic representation of a sensor, sensor carrier and signal magnet used in an embodiment of the present invention.

FIG. 2 shows one arrangement for using sensor 40 to determine the angular position of a rotating engine component which, in the illustrated embodiment, is a camshaft. Specifically, sensor 40 is mounted to a carrier 44 which can be positioned such that sensor 40 is located adjacent an end of a camshaft 48. Sensor 40 has four electrical leads associated with it, specifically a positive voltage source 52, an electrical ground 56 and two sensor output lines 60 and 64, discussed below.

Figure 3:
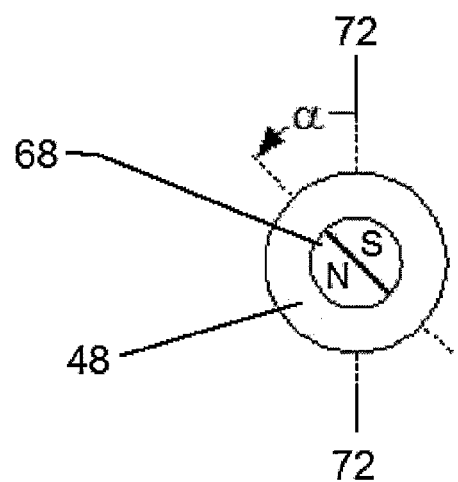
FIG. 3 shows a view, taken along line 3-3 of FIG. 2, of the sensor magnet of FIG. 2.

As shown in FIGS. 2 and 3, a dipole magnet 68 is mounted to center of the end of camshaft 48 such that sensor 40 will experience a North to South and a South to North transition as camshaft 48 experiences a complete (360°) revolution and dipole magnet is selected and spaced from sensor 40 such that sensor 40 is exposed to a level of magnetic flux which is appropriate for its operation. With the above mentioned 2SA-10 sensor, the appropriate level of magnetic flux is between 20 milliTeslas (mT) and 40 mT.

Dipole magnet 68 is mounted to camshaft 48 such that the angular position of camshaft 48 and the North-South transition of dipole magnet 68 are in a known relationship. This can be achieved in a variety of manners, including mounting dipole magnet on a carrier (not shown) which includes an index tab to engage a complementary index slot in camshaft 48, or by any other suitable method as will occur to those of skill in the art.

The positioning of the North-South transition of dipole magnet 68 with respect to a known position of camshaft 48 and the relative angular positioning of sensor 40 is preferably performed with a reasonable level of accuracy, but a level of error can be accommodated and dealt with by electronic calibration of sensor 40 and ECU 24 as will be apparent to those of skill in the art. The required degree of precision with which dipole magnet 68 must be positioned will vary with the desired resolution for determining the angular position of the rotating member.

In operation, when sensor 40 and dipole magnet 68 are properly positioned and configured as described above, sensor output lines 60 and 64 output respective control signals whose voltage varies with the change in the angular position $\alpha$ (as illustrated in FIG. 3) of the North-South transition of dipole magnet 68 with respect to a reference plane 72 of sensor 40.

With the above-mentioned 2SA-10 sensor, sensor output line 60 outputs a voltage signal proportional to the sin of $\alpha$, i.e. $\sin(\alpha)$, and sensor output line 64 outputs a voltage signal proportional to the cosine of $\alpha$, i.e. $\cos(\alpha)$. In a first embodiment of system 20, only one of sensor output lines 60 and 64 is employed by ECU 24 and this results in sensor 40 only requiring a three-wire harness which is the same as many conventional sensor systems require.

In the one or more of the above-mentioned co-pending U.S. provisional applications and U.S. patent application, both the $\sin(\alpha)$ and $\cos(\alpha)$ outputs of the 2SA-10 sensor are processed and a CORDIC algorithm is preferably employed to determine $\arctan(\alpha)$ and obtain $\alpha$. As will be apparent to those of skill in the art, while such a system and method can determine α with high resolution, the implementation of the CORDIC algorithm is computationally expensive and, to ensure that the determined result for α is available when needed, the ECU must be relatively powerful, computationally. Thus, an ECU in the previous inventions can be significantly more expensive than conventional ECUs. Further, as is apparent, with the system and method of the previous inventions an additional lead for the second sensor output line must be included in each sensor wiring harness.

Figure 4:
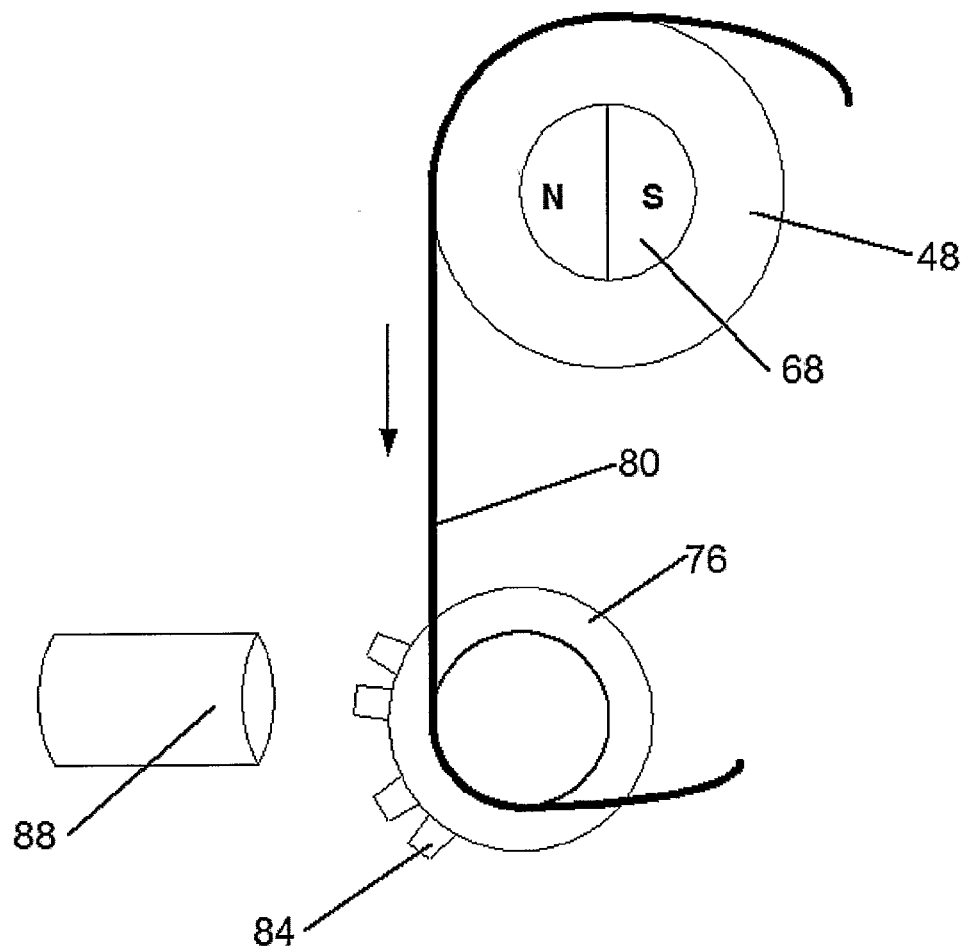
FIG. 4 shows a camshaft and crankshaft of an engine connected by a flexible drive means and a crankshaft position sensor and corresponding toothed gear on the crankshaft.

FIG. 4 shows a typical engine configuration which system 20 can be employed with. Specifically, camshaft 48 is synchronously linked to a crankshaft 76 via a flexible drive means 80, such as a timing belt or chain, or via a gear train (not shown). Crankshaft 76 is equipped with sensor to determine the angular position and/or speed of crankshaft 76 which can be a conventional toothed gear 84 and an inductive pickup sensor 88 or another sensor 40 or any other suitable means of determining the angular position and/or speed of crankshaft 76 as will occur to those of skill in the art.

In the present invention, as will be described below, system 20 can determine the angular position of camshaft 48 with respect to the position of crankshaft 76 (referred to herein as the phase of camshaft 48 with respect to crankshaft 76) at a selected angular position of interest for crankshaft 76, such as a number one cylinder of an engine being at top dead center. Whether crankshaft 76 is at the selected angular position can be determined in any suitable manner, including the conventional technique of counting the teeth of gear 84 as they pass inductive pickup sensor 88.

Preferably, dipole magnet 68 is positioned on camshaft 48 such that the angular position α of the North-South transition of dipole magnet 68 with respect to reference plane 72 is zero degrees, or about zero degrees, or is one hundred and eighty degrees, or about one hundred and eighty degrees, when crankshaft 76 is at the selected angular position of interest and camshaft 48 is at its nominal position (zero phase with respect to crankshaft 76). Positioning the mounting of dipole magnet 68 in this manner allows for reduced computational requirements from ECU 24, but this is not an necessary feature of the invention and is merely preferred, as discussed below.

Figure 5:
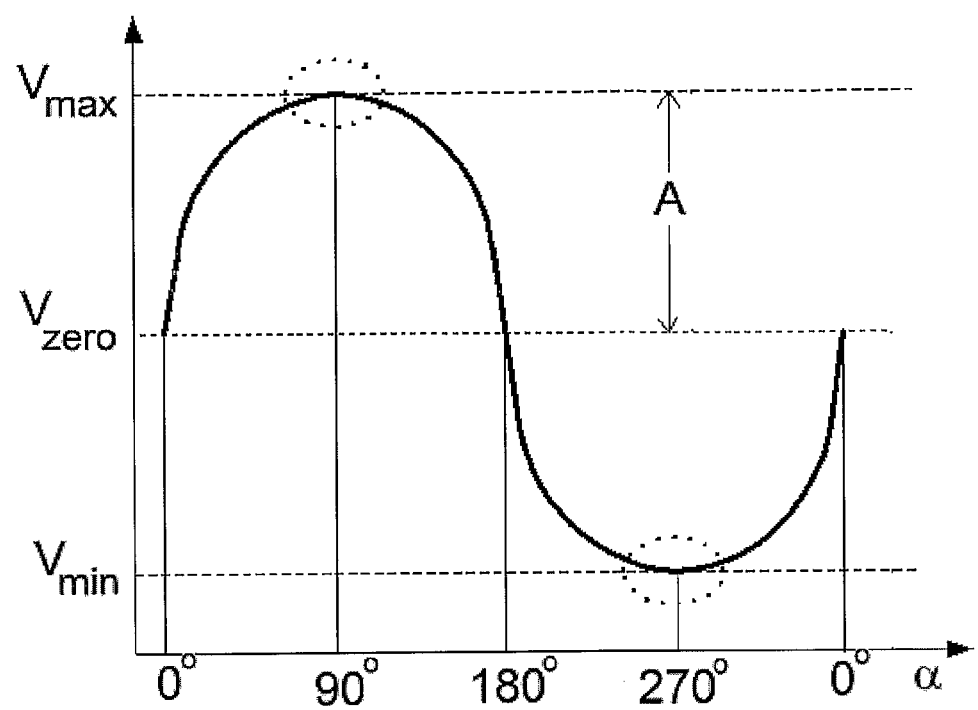
FIG. 5 shows a graph illustrating the output of the sensor of FIG. 2.

FIG. 5 shows the output of sensor output line 60. As illustrated, the output voltage $V_{sensor}$ of sensor output line 60 varies sinusoidally between a maximum output voltage $V_{max}$ and a minimum voltage value $V_{min}$ as angular position α ranges from zero to three hundred and sixty degrees.

It is desirable to normalize the output signal level of sensor output line 60 to simplify processing by ECU 24. Accordingly, $V_{max}$ and $V_{min}$ are determined by sampling the output of sensor output line 60, in the elliptically shaped regions shown in dashed line in the Figure. This sampling can be performed once and the relevant values stored, but it is preferred that the sampling be performed at appropriate intervals during the operation of the vehicle in which engine control system 20 is installed to ensure that any changes, or drift, due to aging of components or due to other causes can be compensated for.

Once a set of values for $V_{max}$ and $V_{min}$ have been determined, $V_{zero}$ is determined from $$V_{zero} = \frac{V_{max} + V_{min}}{2}$$

and the amplitude A, is determined from $$A = \left| \frac{V_{max} - V_{min}}{2} \right|$$

Thus, given $V_{sensor}$, sin(α) can be determined from $$\sin(\alpha) = \frac{V_{sensor} - V_{zero}}{A}$$

As will be apparent to those of skill in the art, sin(α) is approximately equal to α for small values of α (in radians). Thus, for values of up to about ± fifteen degrees, a reasonable approximation is $$\alpha = \frac{V_{sensor} - V_{zero}}{A}$$

although some scaling of the result may be required, but this can easily be accomplished in the execution of the control program in ECU 24.

If it is desired to determine α with greater precision, a memory in ECU 24 can be provided with an array of values of α corresponding to each measured sin(α) within a ninety degree quadrant. In essence, the values of α are predetermined and stored in an array where the signal measured by the sensor (after normalization and scaling) serves as the index to the array.

In a present embodiment, a ten bit scaling value (allowing values from 1 to 512) is employed wherein each normalized and scaled measured value acts as the index to a respective value stored in an array of 512 values, each stored value corresponding to α for its respective index value of 512*sin (α).

To avoid computationally expensive floating point arithmetic, in this embodiment it is preferred to represent the values of α using unsigned sixteen bit integers. Thus, a scaling factor of 0.01° is used for the values of α stored in the array. As will be apparent to those of skill in the art, scaling values of other than 512 and 0.01° can be used as desired.

Using fixed point arithmetic operations and $$\text{Index} = \frac{[512 * (V_{sensor} - V_{zero})]}{A}$$

ECU 24 can directly determine the particular array value representing the value of α, without requiring any computationally expensive calculations or search algorithms. As will be apparent to those of skill in the art, the required multiplication of ($V_{sensor}-V_{zero}$) by 512 can be achieved via a 10 bit shift operation and is thus very computationally efficient, although the order of operations should be performed in accordance with the brackets shown above, to otherwise avoid a possible loss of accuracy from the fixed point arithmetic operations.

To determine which quadrant α is in, ECU 24 can examine the polarity of $V_{sensor}$ over two or more samples to determine if it is negative-going-positive or positive-going-negative. Thus, once the quadrant is determined, the value of α can be determined very quickly and almost immediately after measuring $V_{sensor}$ even when ECU 24 is relatively limited computationally.

Once α has been determined by ECU 24, the value of α is used accordingly by ECU 24 when executing the control program of system 20 to produce a suitable output control signal 36.

FIG. 6 shows the relationship between α and the measurement of the angular position of crankshaft 76, where dipole magnet 68 has been positioned on camshaft 48 and sensor 40 has been mounted such that α is zero when camshaft 48 is in its nominal (zero phasor) position. In the illustration, the measurement of the position of crankshaft 76 is achieved by counting the pulses in pulse train 100, with the selected angular position of interest of crankshaft 76 indicated by the pulses at positions 104. In the Figure, the nominal (zero phasor) position of camshaft 48 is indicated by solid line 108, an advance (positive phasor) position of camshaft 48 is indicated by dotted line 112 and a retarded (negative phasor) position of camshaft 48 is indicated by dotted line 116.

As is apparent in FIG. 6, the change in $\sin(\alpha)$ in the vicinity of zero degrees and in the vicinity of one hundred and eighty degrees is approximately linear and becomes increasingly non linear as $\sin(\alpha)$ approaches ± ninety degrees and ± two hundred and seventy degrees. It can be shown, and it will be apparent to those of skill in the art, that due to the non-linearities of the sin function, the resolution obtained with the present invention in a given quadrant varies from between about 1° to 4° of resolution for α in the range of about 90° to about 84°, about 0.2° to 1° of resolution for α in the range of about 83° to about 55° and to better than about 0.2° of resolution for α in the range of about 54° to about 0°.

For many rotating component measurements, such resolution exceeds the requirements for controlling the engine. In particular, variable valve timing systems typically run with camshaft position to crankshaft position phasors of less than ± thirty degrees, although some systems may have phasors as large as ± forty five degrees. In either case, the resolution of the present invention easily exceeds the resolution required by such systems.

As will also be apparent to those of skill in the art, system 20 can also provide an absolute position for camshaft 48, when camshaft 48 is rotating or stopped, should the determination of such a position be desired.

As discussed above, sensor 40 includes sensor output lines 60 and 64, with sensor output line 60 providing a voltage signal representing $\sin(\alpha)$ and sensor output line 64 providing a voltage signal representing $\cos(\alpha)$. While in the embodiment described above only sensor output line 60 was used, it is also contemplated that that both sensor output lines 60 and 64 can be used in other embodiments of the present invention, at the cost of including another wire in the wire harness to each sensor 40.

The processing of $\cos(\alpha)$ is similar to that of processing $\sin(\alpha)$ described above and should now be apparent to those of skill in the art and will not be discussed in detail herein. However, it should be noted that, if an array of values of α for each measurable $\sin(\alpha)$ has been stored in ECU 24, this same array of values can be used to determine $\cos(\alpha)$ by subtracting an offset value of the scaling value used for the array (512 in the embodiment discussed above) from the array index value Index. Thus, the index for $\cos(\alpha)$ can be obtained from $$\text{Index} = 512 * \frac{V_{sensor} - V_{zero}}{A}$$

$$\text{Index}_{cos} = |\text{Index} - 512|$$

where, in this embodiment, $V_{sensor}$ is the output of sensor output line 64. Thus the array memory requirements are not doubled if both sensor output lines 60 and 64 are used.

One advantage to using both sensor outputs is that, as is known, the outputs of $\sin(\alpha)$ and $\cos(\alpha)$ are ninety degrees out of phase and thus the near-linear portions of each of their output curves occur at different angles α. As mentioned above, the greatest non-linear portion of $\sin(\alpha)$ in the first quadrant occurs for α of between about 84° to about 90°. Similarly, the greatest non-linear portion of $\cos(\alpha)$ in the first quadrant occurs for α of between about 0° to about 6°.

Thus, if the resolution of sensor output line 60 is in it's lower resolution range (α between about 84° to about 90°, for a resolution of between about 1° and 4°, as described above) then sensor output line 64 will be in it's high resolution range with a resolution of better than about 0.2°. In this case, if a high resolution position needs to be determined, ECU 24 can select either the output of the sensor output line 60 or 64, whichever is in its high resolution range, as determined by simply examining the polarities (to determine the quadrant) and magnitudes (to determine whether the sensor is in its higher resolution region) of the sensor outputs 60 and 64. Another advantage to using both sensor output lines 60 and 64 is redundancy. If a failure occurs with either of sensor output lines 60 or 64, system 20 can continue to operate with the remaining one of sensor output lines 60 or 64.

Yet another advantage to using both sensor output line 60 and 64 is that system 20 can accurately determine the static angular position of the rotating member. In the embodiment disclosed herein, where α is determined for camshaft 48, using both sensor output lines 60 and 64 to determine α when the engine is not running provides an accurate angular position of camshaft 48 and, indirectly, of crankshaft 76.

Specifically, in a non-running condition, the phasor between crankshaft 76 and camshaft 48 is known (typically it will be zero degrees) and thus a determined α will directly correspond to the angular position of crankshaft 76. By knowing the static position of crankshaft 76, system 20 can start the engine more efficiently, reducing emissions and reducing torsional forces in the engine at start up. As will be apparent to those of skill in the art, inductive sensors, such as sensor 88, cannot provide a signal when the sensed member (in this case crankshaft 76) is not rotating.

By using both sensor outputs 60 and 64, it is also simple to determine the absolute rotational position of the measured rotating member within a three hundred and sixty degree revolution. Specifically, ECU 24 will determine the polarity of each output line 60 and 64 to determine which quadrant the measured rotating member is in (i.e. "+/+"=$1^{st}$ quadrant; "−/+" second quadrant; "−/−" third quadrant; and "−/+" fourth quadrant) and then the value of α is determined, as described above. Then, depending upon the previously determined quadrant, zero, ninety, one hundred and eight or two hundred and seventy degrees are added to the determined a to obtain the absolute position.

In another embodiment, a pair of the three wire (one sensor output line 60 or 64) configurations described above can be employed, one on each of the intake and exhaust camshafts of a dual camshaft engine. In this manner, the phase (with respect to crankshaft 76) of each camshaft can be determined independently to provide ECU 24 with $\alpha_{exhaust}$, the angular position of the exhaust camshaft 48, and $\alpha_{intake}$, the angular position of the intake camshaft 48. Further, as the camshafts and crankshaft are connected by a synchronous drive (typically a flexible toothed drive belt, timing chain or gear train), if sensor output line 60 is used on one of the camshaft sensors and sensor output line 64 is used on the other camshaft sensor

[i.e.—$\sin(\alpha_{intake})$ and $\cos(\alpha_{exhaust})$ are measured] then ECU 24 can determine the static angular position of crankshaft 76, assuming that the camshaft phasors with respect to crankshaft 76 are zero, or known.

In a similar embodiment, the sensors on each camshaft can use the same sensor output line, i.e.—both sensors use sensor output line 60 for $\sin(\alpha)$ or both sensors use sensor output line 64 for $\cos(\alpha)$. In this embodiment, ECU 24 determines the angular positions of the camshaft at different times. Specifically, ECU 24 determines the angular position of one camshaft at a first selected angular position of interest of crankshaft 76 and then determines the angular position of the other camshaft when crankshaft 76 has rotated to a second selected angular position, ninety degrees from the first selected angular position. As will be apparent to those of skill in the art, this is equivalent to determining $\sin(\alpha_{intake})$ and $\cos(\alpha_{exhaust})$ as discussed above, due to the ninety degree difference in the first and second selected angular positions of crankshaft 76 and the corresponding differences in angular position of the camshafts. This embodiment can be advantageous by only requiring ECU 24 to process the output of one sensor 40 at each of the two selected angular positions of crankshaft 76, thus allowing ECU to perform other processing operations between the two selected angular positions of crankshaft 76. This can be important if ECU 24 is relatively heavily loaded with computations for other vehicle systems.

The present invention provides a control system and method for controlling a vehicle system, such as an engine or vehicle dynamics system, wherein the controller uses the angular position of a rotating component, and in particular the angular phase of the rotating component to another rotating component, as an input. For example, in an engine with variable valve timing, the system and method can use the phasor between a camshaft and the engine crankshaft as an input to control the valve timing.

The phasor input is determined with high resolution, yet is determined in a computationally efficient manner which reduces the amount of computation which must be performed by the controller. By producing a high resolution result in a computationally efficient manner, the result can be available to the controller almost immediately after the measurement is taken and the expense of controller can be less than it otherwise would be, as less computation must be performed. Further, the engine, or other vehicle system, can be operated with increased accuracy and/or performance. In some embodiments, the system and method can also accurately determine the static angular position of one or more rotating members and/or can determine the absolute dynamic or static position of a rotating member.

The above-described embodiments of the invention are intended to be examples of the present invention and alterations and modifications may be effected thereto, by those of skill in the art, without departing from the scope of the invention which is defined solely by the claims appended hereto.

I claim:

1. A system for controlling a vehicle system, comprising:
a programmable controller having at least two inputs and at least one output;
a first sensor operable to apply a voltage level to a first one of said at least two inputs, the voltage level varying sinusoidally with the angular position of a rotating component of the vehicle system;
a second sensor operable to provide a signal to a second of said at least two inputs indicating the time at which the controller is to determine the angular position of the rotating component and wherein, in response to the signal from the second sensor, the controller determines the angular position of the rotating component represented by the voltage level at the first of said at least two inputs and, in accordance with a control program the controller is executing, the controller provides an appropriate output control signal to the vehicle system on said at least one output.

2. The system of claim 1 wherein the first sensor is located adjacent a dipole magnet which rotates with the rotating component and the voltage level applied to the first of said at least two inputs by the first sensor indicates the angular position of a North to South transition of the magnetic field of the dipole magnet received by the first sensor.

3. The system of claim 2 wherein the controller normalizes the voltage level applied by the first sensor and uses the resulting normalized voltage level as an index to the elements of an array of angular positions stored in the controller, the determined angular position being that represented by the value in the element indicated by the index.

4. The system of claim 3 wherein the normalization of the voltage level is performed with fixed point arithmetic operations in said controller.

5. The system of claim 1 wherein the vehicle system is an engine and the rotating component for which the controller determine the angular position is a camshaft.

6. The system of claim 5 wherein the second sensor determines when the angular position of the crankshaft of the engine is at a selected position.

7. The system of claim 1 wherein said programmable controller includes at least three inputs, the system further comprising a third sensor operable to apply a voltage level to a third one of said at least three inputs, the voltage level varying sinusoidally with the angular position of a second rotating component of the vehicle system and wherein the controller determines the angular position of the rotating component represented by the voltage level at the first of said at least two inputs and determines the angular position of the second rotating component represented by the voltage level at the third of said at least three inputs and, in accordance with a control program the controller is executing, the controller provides an appropriate output control signal to the vehicle system on said at least one output.

8. The system of claim 7 wherein the sinusoidally varying voltage level output by the first sensor is ninety degrees out of phase with the sinusoidally varying voltage level output by the third sensor.

9. The system of claim 8 wherein the vehicle system is an engine and the rotating member and the second rotating member are camshafts which are synchronously connected to a crankshaft of the engine and wherein the controller is further operable to determine the static angular position of the crankshaft.

10. The system of claim 1 wherein the first sensor is operable to apply a first voltage level to a first one of said at least two inputs and a second voltage level to another of said at least two inputs, the first voltage level varying sinusoidally with the sin of the angular position of a rotating component of the vehicle system with respect to a reference plane of said first sensor and the second voltage level varying sinusoidally with the cosine of the angular position of a rotating component of the vehicle system with respect to a reference plane of said first sensor.

11. The system of claim 10 wherein the controller selects one of said first and second voltage levels to determine the angular position of the rotating component represented by the voltage level, the controller selecting the one of said first and second voltage levels which is in a predefined voltage range providing a better resolution for the determined angular position.

12. The system of claim 10 wherein the controller is further operable to determine an absolute angular position of the rotating member when the rotating member is stationary by processing both of the first and second voltage levels.

13. The system of claim 10 wherein the controller processes both of the first and second voltage levels to determine the angular position of the rotating component within a three hundred and sixty degree position.

14. A method of controlling the operation of a vehicle system with a determined angular position of a first rotating component in the vehicle system as an input to the control process, comprising the steps of:
  at a time of interest, receiving from a sensor a voltage whose level varies sinusoidally with the angular position of the first rotating component;
  normalizing and scaling the received voltage such that the normalized and scaled received voltage level is within a range of possible index values of an array of elements storing pre-computed angular position values;
  retrieving the pre-computed angular position value stored in the array element indicated by the index value corresponding to the normalized and scaled received voltage value; and
  using the retrieved pre-computed angular position value as an input to control the vehicle system.

15. The method of claim 14 wherein the time of interest is the occurrence of a selected angular position for a second rotating component and the retrieved pre-computed angular position value represents a phasor between the angular positions of the first rotating component and the second rotating component.

16. The method of claim 15 wherein the vehicle system being controlled is a vehicle engine and the first rotating component is a camshaft and the second rotating component is a crankshaft.

* * * * *